US008622350B1

(12) United States Patent
Hoffenberg

(10) Patent No.: US 8,622,350 B1
(45) Date of Patent: Jan. 7, 2014

(54) COMPOUND LEADING EDGE DEVICE FOR AIRCRAFT

(75) Inventor: Robert Hoffenberg, Seattle, WA (US)

(73) Assignee: The Boeing Company, Chicago, IL (US)

(*) Notice: Subject to any disclaimer, the term of this patent is extended or adjusted under 35 U.S.C. 154(b) by 156 days.

(21) Appl. No.: 13/295,131

(22) Filed: Nov. 14, 2011

(51) Int. Cl.
B64C 3/50 (2006.01)

(52) U.S. Cl.
USPC .............................. 244/214; 244/215; 244/213

(58) Field of Classification Search
USPC ......................................................... 244/214
See application file for complete search history.

(56) References Cited

U.S. PATENT DOCUMENTS

| | | | | |
|---|---|---|---|---|
| 1,780,838 A * | 11/1930 | Page | | 244/203 |
| 3,785,594 A * | 1/1974 | Lee | | 244/216 |
| 3,935,754 A * | 2/1976 | Comollo | | 74/665 F |
| 3,949,957 A * | 4/1976 | Portier | | 244/210 |
| 4,360,176 A * | 11/1982 | Brown | | 244/214 |
| 4,427,168 A | 1/1984 | McKinney et al. | | |
| 4,437,631 A * | 3/1984 | Martens et al. | | 244/214 |
| 4,471,927 A * | 9/1984 | Rudolph et al. | | 244/215 |
| 4,471,928 A * | 9/1984 | Cole | | 244/215 |
| 4,575,030 A * | 3/1986 | Gratzer | | 244/209 |
| 4,640,477 A * | 2/1987 | Pace | | 244/214 |
| 4,687,162 A * | 8/1987 | Johnson et al. | | 244/213 |
| 5,050,822 A * | 9/1991 | Whitehouse et al. | | 244/215 |
| 5,158,252 A * | 10/1992 | Sakurai | | 244/214 |
| 5,628,477 A * | 5/1997 | Caferro et al. | | 244/214 |
| 5,680,124 A * | 10/1997 | Bedell et al. | | 340/945 |
| 5,686,907 A * | 11/1997 | Bedell et al. | | 340/945 |
| 5,927,656 A * | 7/1999 | Hinkleman | | 244/203 |
| 6,299,108 B1 * | 10/2001 | Lindstrom et al. | | 244/213 |
| 6,466,141 B1 * | 10/2002 | McKay et al. | | 340/963 |
| 6,796,534 B2 * | 9/2004 | Beyer et al. | | 244/214 |
| 7,322,547 B2 * | 1/2008 | Konings | | 244/214 |
| 7,578,484 B2 * | 8/2009 | Fox et al. | | 244/214 |
| 7,744,034 B2 * | 6/2010 | Coughlin | | 244/129.4 |
| 7,766,282 B2 * | 8/2010 | Kordel et al. | | 244/215 |
| 7,828,250 B2 * | 11/2010 | Wheaton et al. | | 244/214 |
| 7,878,459 B2 * | 2/2011 | Mabe et al. | | 244/213 |
| 7,913,949 B2 | 3/2011 | Hoffenberg | | |
| 8,128,038 B2 * | 3/2012 | Whitehouse et al. | | 244/214 |
| 8,181,913 B2 * | 5/2012 | Jaggard et al. | | 244/214 |
| 8,286,921 B2 * | 10/2012 | Heller | | 244/214 |
| 2002/0195527 A1 * | 12/2002 | Broadbent | | 244/214 |
| 2008/0302919 A1 * | 12/2008 | Hoffenberg | | 244/214 |
| 2010/0084515 A1 * | 4/2010 | Jaggard | | 244/214 |
| 2011/0290945 A1 * | 12/2011 | Peirce | | 244/213 |

* cited by examiner

Primary Examiner — Christopher P Ellis
Assistant Examiner — Medhat Badawi
(74) Attorney, Agent, or Firm — Ostrager Chong Flaherty & Broitman P.C.

(57) ABSTRACT

A small secondary leading edge device, called a compound Krueger vane, works in parallel with a primary device (e.g., a Krueger flap) to delay flow separation on an aircraft wing. The compound Krueger vane is deployed behind a gapped Krueger flap to turn flow ahead of the wing attachment region on the underside of the wing. The compound Krueger vane turns flow that moves forward from the wing lower surface attachment region toward the leading edge of the wing, thereby delaying flow separation on the aircraft wing.

16 Claims, 5 Drawing Sheets

COMPOUND LEADING EDGE DEVICE FOR AIRCRAFT

BACKGROUND

This disclosure generally relates to high-lift leading edge flaps for the wings of an aircraft, and more particularly to a Krueger leading edge flap having at least a stowed position for high-speed cruise operation and a forwardly extended position in which the forward edge of the Krueger flap forms an aerodynamic slot with the leading edge of the aircraft wing for takeoff and landing.

Modern aircraft often use a variety of high-lift leading and trailing edge devices to improve high-angle of attack performance during various phases of flight, including takeoff and landing. Existing leading edge devices include leading edge slats and Krueger flaps.

Current leading edge slats generally have a stowed position in which the slat forms a portion of the leading edge of the wing, and one or more deployed positions in which the slat extends forward and down to increase the camber and/or planform area of the wing. The stowed position is generally associated with low drag at low angles of attack and can be suitable for cruise and other low angle of attack operations. The extended position(s) is/are generally associated with improved airflow characteristics over the aircraft's wing at higher angles of attack. Typical leading edge slat designs include arrangements in which the leading edge device retracts in an aft direction to form the leading edge of the wing when stowed.

Krueger flaps have generally the same function as leading edge slats, but rather than retracting aft to form the leading edge of the cruise wing, Krueger flaps are hinged, and typically fold into the lower surface of the wing when stowed. When deployed, Krueger flaps extend forward from the under surface of the wing, increasing the wing camber and maximum coefficient of lift.

In the case of a typical Krueger flap, a slot or gap is created between the flap and the wing as the flap is extended forward. During certain operating conditions, air can flow through this slot to energize the airflow over the upper surface of the wing, and improve overall airflow characteristics over the wing.

For some airplane applications, such as extended laminar flow or high cruising speeds, it may be advantageous to design a wing with a small leading edge radius. A small leading edge radius can cause premature flow separation (stall) on the wing surface, even when a Krueger flap is present. This has unfavorable consequences in aerodynamics, since flow separation can significantly decrease lift and increase drag of the wing.

Existing leading edge devices turn the air flow as it moves aft. Turning the aft-moving flow before it reaches the wing leading edge is a necessary condition for delaying stall of a sharp-nosed wing, but it may not be sufficient. This is particularly true if the leading edge device must be positioned high relative to the wing leading edge, as is required for some configurations.

SUMMARY

The leading edge device disclosed hereinafter is designed to mitigate the effect of a small leading edge radius on an aircraft wing. This leading edge device may be embodied in many different ways. In accordance with the embodiments disclosed hereinafter, the device comprises a small secondary leading edge device that works in parallel with a primary device (e.g., a Krueger flap) to delay flow separation at the leading edge of an aircraft wing. More specifically, a compound Krueger vane is deployed behind a gapped Krueger flap to turn flow ahead of the wing attachment region on the underside of the wing. The attachment region is the vicinity around the attachment line; the streamline which divides the flow that travels across the upper and lower wing surfaces. Traditional leading edge devices turn streamwise flow to the upper wing surface as it moves aft (toward the trailing edge of the wing). The compound Krueger vane turns flow that moves forward from the wing lower surface attachment region toward the leading edge of the wing, thereby delaying flow separation at the leading edge of the aircraft wing.

One aspect of the disclosed subject matter is an aircraft comprising: a wing having a leading edge including a leading edge spanwise section formed by an upper surface and a lower surface; a leading edge flap coupled to the wing, the flap being disposed generally parallel to and forward of the leading edge spanwise section of the wing; and a vane coupled to the wing, the vane being disposed generally parallel to and under the leading edge spanwise section of the wing, wherein the vane is closer to the leading edge of the wing than the flap is.

Another aspect of the disclosed subject matter is a leading edge assembly for an airplane wing having upper and lower surfaces that meet at a leading edge, the assembly comprising: a leading edge flap coupled to the wing, the flap being disposed generally parallel to and forward of a leading edge of a spanwise section of the wing; and a vane coupled to the wing, the vane being disposed generally parallel to and under the leading edge of the spanwise section of the wing, wherein the vane is closer to the leading edge of the wing than the flap is.

A further aspect of the disclosed subject matter is a method of directing air flow relative to a leading edge of a wing, the method comprising: (a) moving a leading edge flap from a stowed position to a deployed position, the flap being disposed generally parallel to and forward of a leading edge of a spanwise section of the wing when in its deployed position and forming part of a lower surface of the spanwise section of the wing when in its stowed position; and (b) moving a vane from a stowed position to a deployed position, the vane being disposed generally parallel to and under the leading edge of the spanwise section of the wing when in its deployed position and being disposed inside the wing in its stowed position, wherein the vane is closer to the leading edge of the wing than the leading edge flap is when the flap and the vane are in their respective deployed positions.

Yet another aspect of the disclosed subject matter is an aircraft wing comprising: a leading edge and first and second leading edge airfoil-shaped bodies spaced apart from each other and relative to the leading edge along a direction away from the wing, wherein the first and second leading edge airfoil-shaped bodies in combination are configured and positioned relative to the leading edge to direct airflow from a position under the leading edge to a position in front of the leading edge.

BRIEF DESCRIPTION OF THE DRAWINGS

Various embodiments will be hereinafter described with reference to drawings for the purpose of illustrating the foregoing and other aspects of the disclosed subject matter.

Reference will hereinafter be made to the drawings in which similar elements in different drawings bear the same reference numerals.

DETAILED DESCRIPTION

Although embodiments are disclosed in detail below, various changes may be made and equivalents may be substituted for elements thereof without departing from the scope of the subject matter disclosed herein. In addition, many modifications may be made to adapt a particular situation to the teachings without departing from the essential scope thereof. Therefore it is intended that the claims not be limited to the particular embodiments disclosed hereinafter.

Well-known apparatus, such as linking mechanisms, will not be shown or described in detail below. Descriptions of known Krueger flaps and associated linking mechanisms can be found, for example, in U.S. Pat. Nos. 7,578,484 and 5,158,252, both assigned to the present assignee. U.S. Pat. No. 7,578,484 discloses a Krueger flap comprising a rigid fixed-shape leading edge panel and a rigid fixed-shape bullnose pivotably coupled thereto, whereas U.S. Pat. No. 5,158,252 discloses a variable camber Krueger flap. The difference between rigid Krueger flaps and variable camber Krueger flaps occurs after those devices deploy from the stowed position. The panel of a variable camber Krueger flap flexes; the panel on a rigid Krueger flap does not. The compound Krueger vane disclosed herein is not limited in its application to any particular type of Krueger flap or to any particular shape of the Krueger flap.

Figure 1:
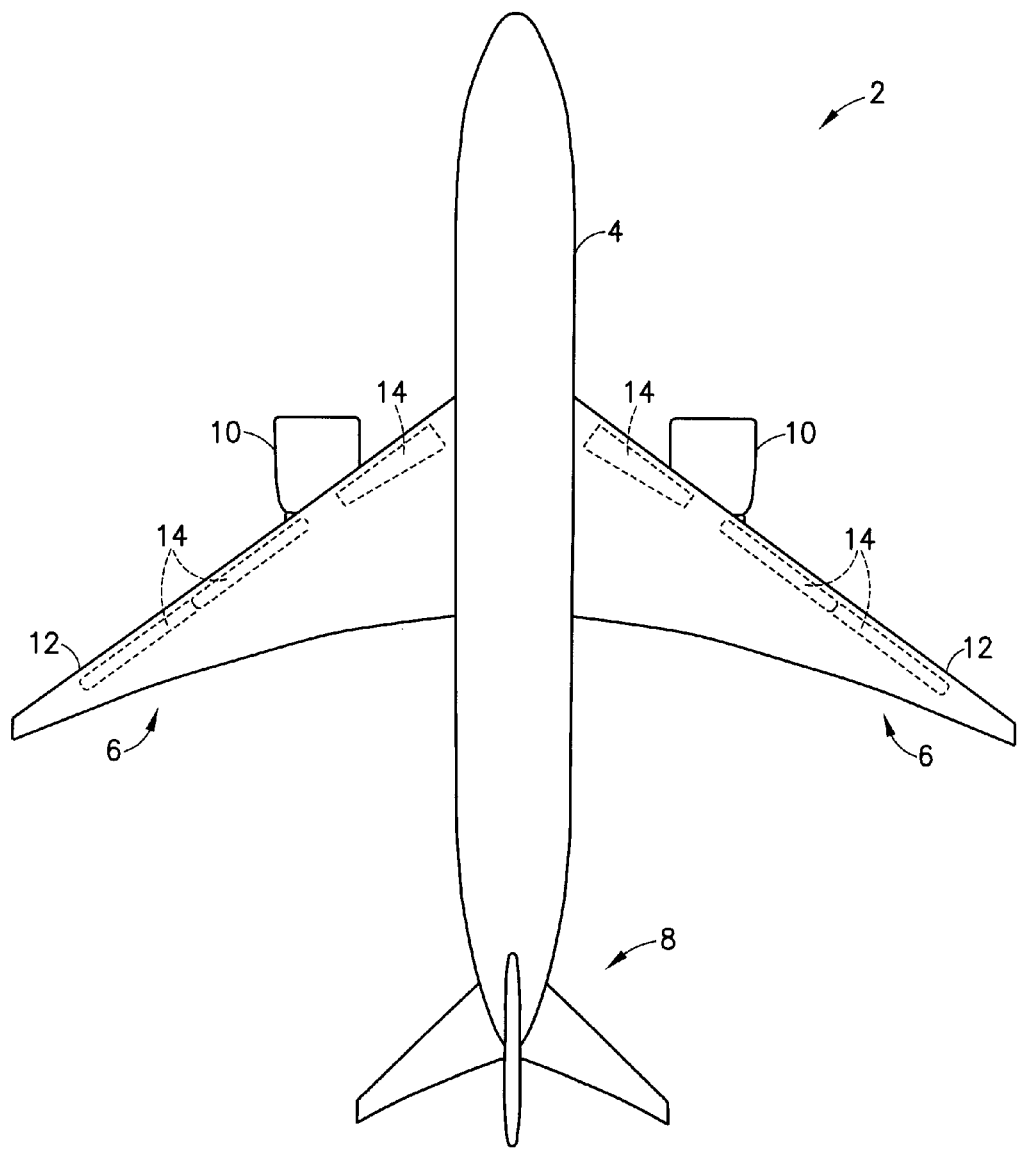
FIG. 1 is a diagram showing a plan view of an airplane having wings equipped with Krueger flaps.

FIG. 1 is a plan view of an airplane 2 comprising a fuselage 4, a pair of wings 6, an empennage 8, and wing-mounted engines 10. The leading edges 12 of the wings 6 are equipped with a multiplicity of leading edge assemblies 14 (indicated by dashed lines). Each leading edge assembly 14 comprises a Krueger flap and an associated set of linking mechanisms (not shown in FIG. 1). In conventional manner, Krueger flaps can be deployed to improve high-angle of attack performance during takeoff and landing. When in the stowed position, the Krueger flaps are disposed beneath the wing leading edge 12 and define a portion of the lower skin surface of the wing. Upon actuation, the Krueger flaps move from a stowed position within the wing envelope through any desired rotational angle to a fully deployed position. Krueger flaps can be made from metal, composites, or both. The Krueger flaps may include thin panels, hollow-core structures, matrix composite structures, or solid sections.

Figure 2:
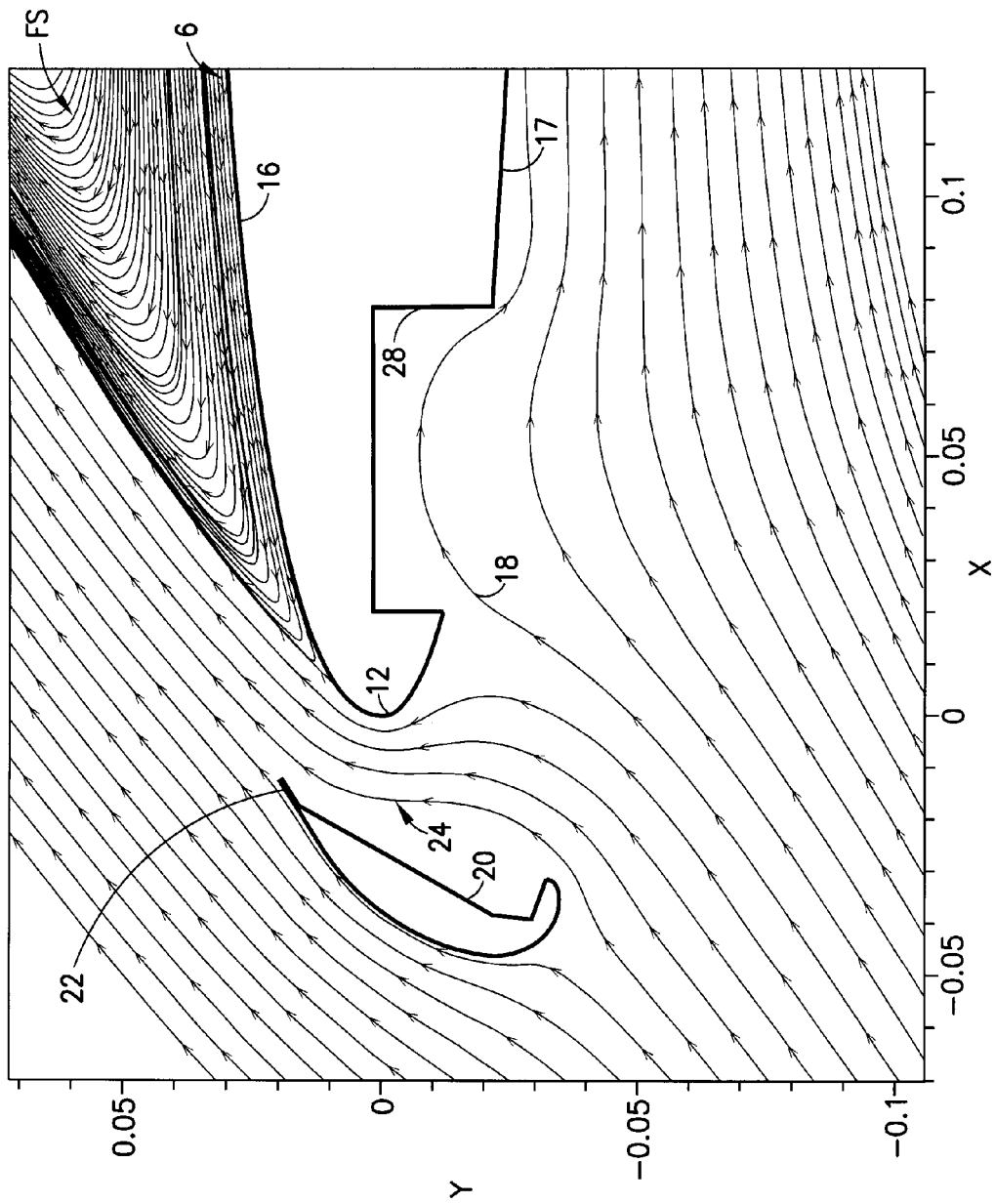
FIG. 2 is a diagram showing simulated air flow past a leading edge of a wing of an airplane at a high angle of attack, which leading edge is equipped with a Krueger flap. The Krueger flap is shown in a deployed position where a slot or gap is formed between the forward edge of the flap and the leading edge of the wing.

The results of a computational flow simulation are shown in FIG. 2. The curved shape in the center of FIG. 2 represents a leading edge 12 of a Krueger flap-equipped wing 6. The curved element in front of the wing leading edge 12 represents a deployed Krueger flap 20. The streamlines with spaced arrowheads represent the paths and directions of air flowing relative to the deployed Krueger flap 20 and the wing leading edge 12 of an aircraft flying at a high angle of attack. When the Krueger flap 20 is in the deployed position shown in FIG. 2, an opening 28 is formed in the wing lower surface 17 and a slot or gap 24 is formed between the trailing edge 22 of the flap 20 and the leading edge 12 of the wing 6. In this deployed position, flap 20 is disposed generally parallel to and forward of a leading edge 12 of a spanwise section of the wing 6. In its stowed position, the flap 20 forms a part of the lower surface 17 of the same spanwise section of the wing 6. Streamline 18 generally indicates the boundary of air flowing in the aft direction underneath the wing.

The Krueger flap 20 depicted in FIG. 2 is configured to provide enhanced high-lift characteristics for wing 6. The wing 6 can be configured to cruise at high subsonic Mach numbers representative of typical commercial transport airliners. The wing 6 comprises an upper surface 16, a lower surface 17, and a leading edge 12 that is faired smoothly into both the upper surface 16 and the lower surface. When the Krueger flap 20 is in its stowed position, a portion of the flap 20 will seal the opening 28 to provide for a generally continuous, aerodynamically smooth lower surface 17. When the Krueger flap 20 is deployed, as shown in FIG. 2, the opening 28 is exposed and the slot 24 is formed.

The simulation whose results are depicted in FIG. 2 was based on certain assumptions, including that the leading edge radius is small relative to the chord length of the simulated wing and that the aircraft is flying at a high angle of attack. The simulation results indicate that under such conditions, flow separation (indicated by arrow FS) can occur starting at the leading edge 12 and continuing along the upper surface 16 of wing 6. When the air flow separates from the upper surface 16, the air closest to the upper surface 16 flows in a forward direction relative to the wing.

To delay the flow separation depicted in FIG. 2, a secondary leading edge device can be installed aft of the Krueger flap 20. In this regard, the secondary leading device or Krueger vane 30, described in more detail below, is deployed proximal to the leading edge 12 of the wing 6 relative to the Krueger flap 20 that is deployed distal to the leading edge 12 of wing 6 when compared to the Krueger vane 30.

Figure 3:
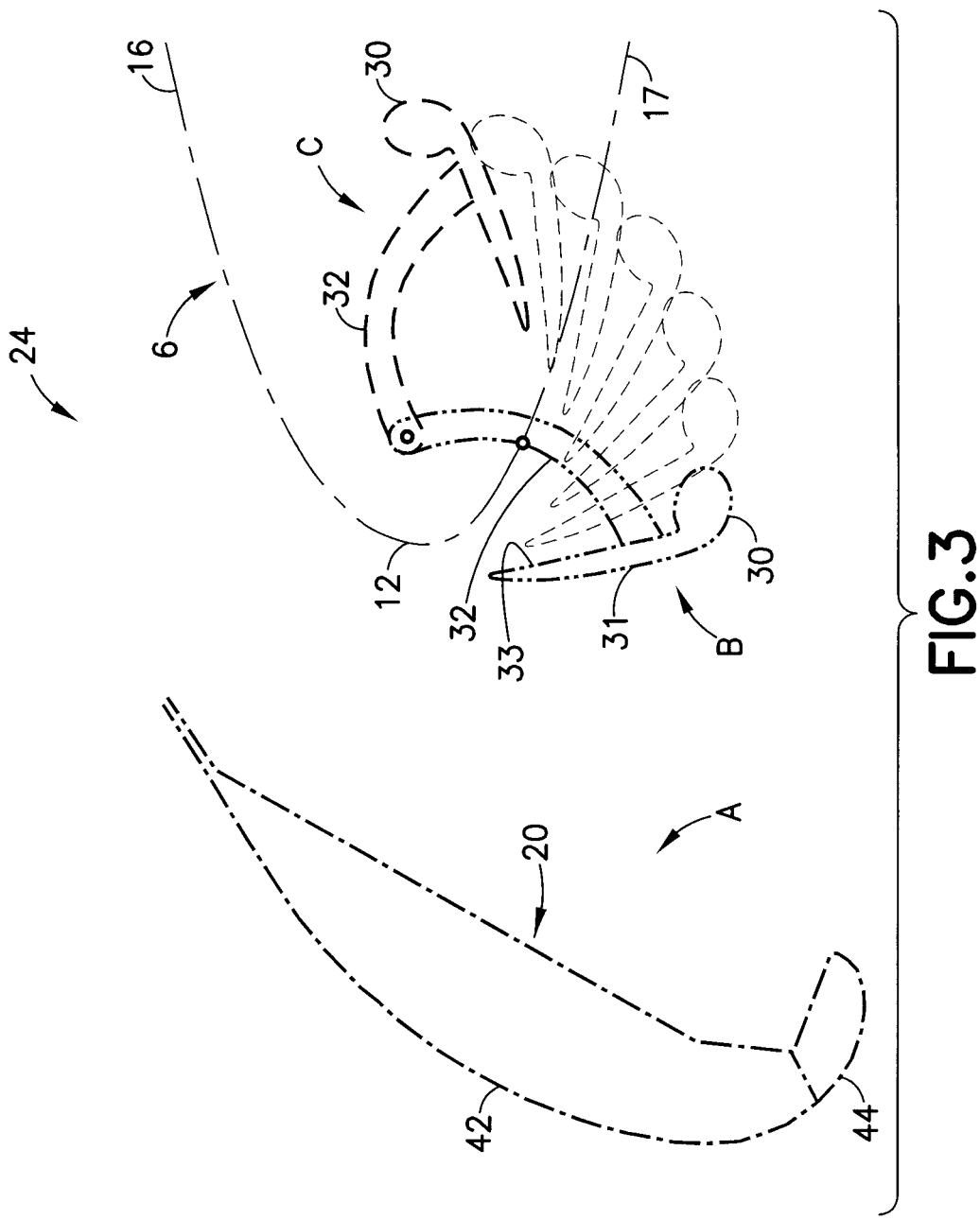
FIG. 3 is a diagram showing stowed, deployed, and intermediate positions of a secondary vane (referred to hereinafter as a "compound Krueger vane") in accordance with one embodiment, which vane is disposed between the Krueger flap and the wing leading edge when the Krueger flap and compound Krueger vane are in their deployed positions.

In accordance with one embodiment partly depicted in FIG. 3, the secondary leading edge device comprises a compound Krueger vane 30 attached to an arm 32 that is pivotably coupled to wing 6. Each vane 30 is pivotable between stowed and deployed positions respectively represented by dashed lines and dash-dotted lines in FIG. 3. Intermediate angular positions of the compound Krueger vane 30 are shown by thin dashed lines. In accordance with other embodiments, the compound Krueger vane 30 could be actuated by a relatively more complicated mechanism, such as a scissor-type linkage. Alternatively, the compound Krueger vane 30 may be attached to the linkages being used to extend the main leading edge device.

The compound Krueger vane 30 may have the cross-sectional shape and be positioned as depicted in FIG. 3. However, the shape of the compound Krueger vane 30 may vary depending on the application, much like the shape of conventional leading edge devices. A variety of shapes could provide the intended function. In the present case, the intended function is to delay flow separation on the wing upper surface 16, for example, under the conditions which were simulated to produce FIG. 2.

FIG. 3 also depicts a Krueger flap 20 having a well-known structure comprising a leading edge panel 42 and a bullnose 44 that is pivotably connected (not shown in FIG. 3) to the leading edge panel 42. The bullnose 44 is folded inward when the Krueger flap 20 is stowed. The leading edge panel 42 is depicted as the flexed panel of a variable-camber Krueger flap, but Krueger panels can also be rigid. A panel support structure can be positioned to support the streamwise flow surface and maintain its shape. Accordingly, the streamwise flow surface may undergo small deflections due to aerodynamic loading. The bullnose 44 can also include a generally rigid, fixed-shape flow surface.

The Krueger flap 20 is shown in its fully deployed position A in FIG. 3. In this position, the leading edge panel 42 of the Krueger flap 20 is positioned forward of and forms a gap 24 with the wing leading edge 12. The bullnose 44 of Krueger flap 20 is positioned under the leading edge panel 42. In this configuration, the Krueger flap 20 turns the air flow before it reaches the leading edge of the wing 6, which allows the wing 6 to operate efficiently at high angles of attack. Such angles of attack may be encountered during approach, landing, and takeoff.

Still referring to FIG. 3, each compound Krueger vane 30 is disposed generally parallel to and under a spanwise section of the leading edge 12 of wing 6 when in its deployed position B and is disposed inside the wing envelope in its stowed position C. When the flap 20 and vane 30 are in their respective deployed positions (A and B as shown in FIG. 3), the vane 30 is considered closer or proximal to leading edge 12 than is the flap 20, which is positioned distal to the leading edge 12 when compared to the vane 30. The vane 30 comprises an outer aerodynamic surface 31 that faces flap 20 and an inner aerodynamic surface 33 that faces the wing 6 when the flap 20 and vane 30 are both deployed. The inner aerodynamic surface 33 of the vane 30 turns air flow that moves forward from a flow attachment region, generally shown as region R in FIG. 4, toward the leading edge 12 of wing 6 when Krueger flap 20 and vane 30 are in their respective deployed positions during flight at a high angle of attack.

Figure 4:
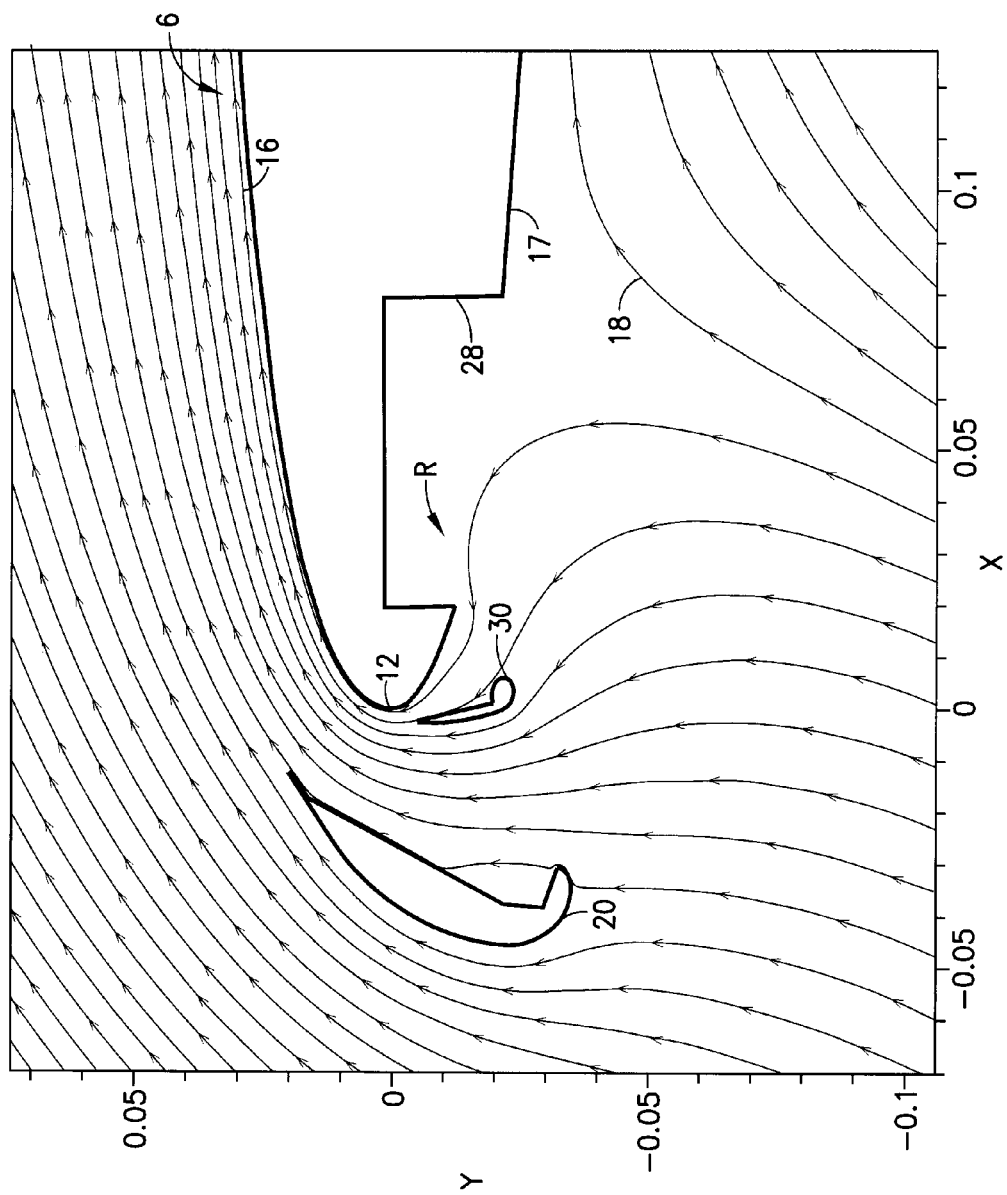
FIG. 4 is a diagram showing simulated air flow past the leading edge of the wing depicted in FIG. 3 at a high angle of attack.

The simulation results depicted in FIG. 4 were based on the same conditions assumed for the simulation results depicted in FIG. 2, except that the effect of a compound Krueger vane 30 was also taken into account. The simulation results shown in FIG. 4 indicate that under similar conditions, the compound Krueger vane delays flow separation at the leading edge 12 of the wing 6. More specifically, the addition of the compound Krueger vane 30 produces attached flow on the wing upper surface 16 as opposed to the flow separation FS depicted in FIG. 2.

Figure 5:
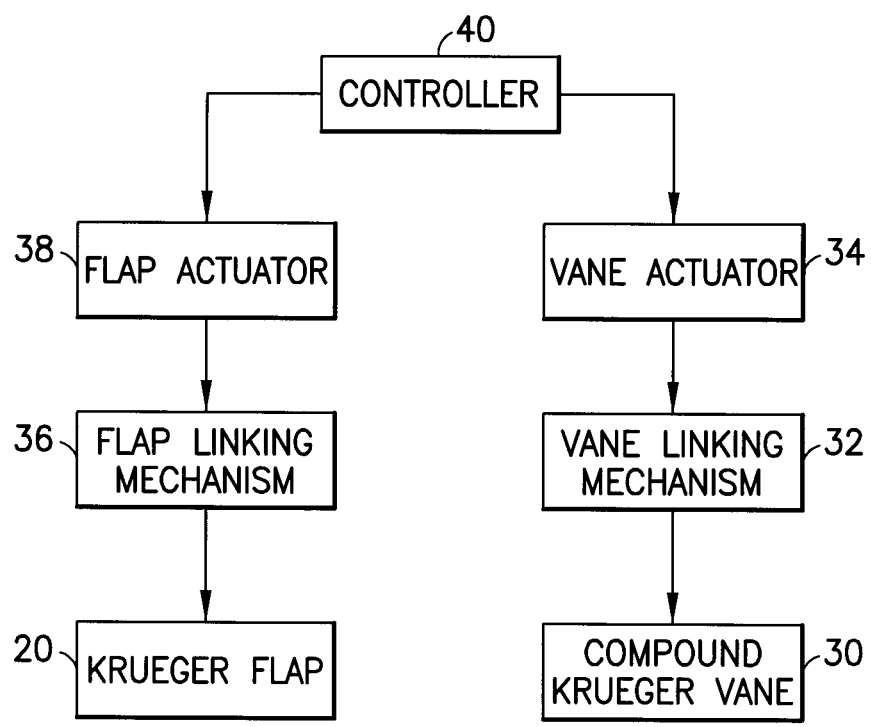
FIG. 5 is a block diagram showing components of a computer-controlled system for coordinated actuation of a Krueger flap and a compound Krueger vane in accordance with one embodiment.

Referring to FIG. 5, each Krueger flap 20 is coupled to a wing by means of a suitable flap linking mechanism 36 having a flap stowed configuration and a flap deployed configuration. The flap linking mechanism 36 can be reconfigured in response to the application of a driving force by a flap actuator 38, which has at least two operational modes. In one mode, the flap actuator 38 causes the flap linking mechanism 36 to extend from the flap stowed position to the flap deployed position, thereby causing the Krueger flap to deploy to a position whereat a slot or gap is formed between the forward edge of the Krueger flap and the leading edge of the wing. In another mode, the flap actuator 38 causes the flap linking mechanism 36 to retract from the flap deployed configuration to the flap stowed configuration.

The structural details of the link mechanism for deploying the Krueger flaps are not shown in the drawings. Many link mechanisms for Krueger flaps are known. The configuration of the link mechanism will depend on the desired flap position relative to the wing leading edge when each Krueger flap is deployed. When each Krueger flap is stowed, it is received within a respective leading edge cavity. The leading edge cavity also houses the Krueger flap link mechanism (not shown). The link mechanism can be powered by any number of known actuator arrangements, and can be coupled to multiple (two or more) link mechanisms spaced along a spanwise section of the wing. Each Krueger flap arranged along a wing leading edge may be deployed by actuation of a respective set of two or more linking mechanisms.

Still referring to FIG. 5, each compound Krueger vane 30 is coupled to a wing by means of a vane linking mechanism 32 having a vane stowed position and a vane deployed position. The vane linking mechanism 32 can extend in response to the application of a driving force by a vane actuator 34, which also has two operational modes. In one mode, the vane actuator 34 causes the vane linking mechanism 32 to extend from the vane stowed position to the vane deployed position, thereby causing the compound Krueger vane 30 to deploy to a position whereat a small gap is formed between the forward edge of the compound Krueger vane 30 and the leading edge 12 of the wing 6. In another mode, the vane actuator 34 causes the vane linking mechanism 32 to retract from the vane deployed position to the vane stowed position. In the example depicted in FIG. 3, the vane pivots from a vane stowed angular position to a vane deployed angular position.

Methods and systems for controlling the actuation of Krueger flaps are well known. In accordance with the embodiment disclosed herein, a controller 40 controls the operation of vane actuator 34 and flap actuator 38 by transmitting electrical control signals along respective signaling channels, such as electrical cables, optical fibers, or other means, from controller 40 to actuators 34 and 38. The flap and vane actuators may comprise pneumatic or hydraulic cylinders having associated mechanical means for converting the linear movement of the piston into a force that drives rotation of the flap or vane linking mechanism. Alternatively, the flap and vane may be driven by rotary actuators or electric motors.

The controller 40 may comprise a computer programmed to execute routines or a non-programmable electronic device. The controller 40 can be activated by the pilot or it can be preprogrammed according to flight conditions. The controller can be embodied in a special-purpose computer or a data processor that is specifically programmed, configured or constructed to perform computer-executable routines for flap and vane actuation. In particular, the controller 40 may be part of the flight control system.

The controller 40 can independently control the operation of the vane actuator 34 and the flap actuator 38 to produce the deployed configuration depicted in FIG. 3. Accordingly, the controller 40 can be programmed to first actuate the deployment of flap 20 and then actuate the deployment of vane 30. Alternatively, controller 40 can be programmed to cause the flap 20 and vane 30 to deploy concurrently. In accordance with a further alternative (not shown), the vane linking mechanism 32 and the flap linking mechanism 36 could be mechanically coupled to a common actuator (not shown) which actuates the mechanisms in tandem.

While the disclosed subject matter has been described with reference to various embodiments, it will be understood by those skilled in the art that various changes may be made and equivalents may be substituted for elements thereof without departing from the intended scope. In addition, many modifications may be made to adapt a particular situation to the teachings without departing from the essential scope thereof. Therefore it is intended that the claims not be limited to the particular embodiments disclosed.

The method claims set forth hereinafter should not be construed to require that all steps of the method be performed in alphabetical order or in the order in which they are recited. In particular, the method claims should be construed to encompass two operations being performed concurrently or in sequence.

The invention claimed is:

1. An aircraft comprising:
   a wing having a leading edge including a leading edge spanwise section formed by an upper surface and a lower surface;
   a leading edge flap coupled to said wing, said flap being disposed forward of the leading edge spanwise section of said wing and comprising a trailing edge, said trailing edge of said leading edge flap and said leading edge of said wing forming a slot; and
   a vane coupled to said wing,
   wherein said vane comprises an inner aerodynamic surface that is separated from said wing and an outer aerodynamic surface that is separated from said leading edge flap, and
   wherein as some air flows between said outer aerodynamic surface of said vane and said leading edge flap and then through said slot, other air flowing in a forward direction underneath said wing is deflected by said inner aerodynamic surface of said vane toward said slot.

2. The aircraft as recited in claim 1, wherein said vane directs air flow forward from an attachment region of said wing lower surface toward said leading edge of said wing.

3. The aircraft as recited in claim 1, wherein said vane is pivotably coupled to said wing and moveable between stowed and deployed positions.

4. The aircraft as recited in claim 3, further comprising moveable linkages mounted to said wing, wherein said vane is attached to said linkages, each of said linkages having a first position when said vane is in its stowed position and a second position when said vane is in its deployed position.

5. A leading edge assembly for an airplane wing having upper and lower surfaces that meet at a leading edge, said assembly comprising:
   a leading edge flap coupled to the wing, said flap being disposed forward of a leading edge of a spanwise section of the wing and comprising a trailing edge, said trailing edge of said leading edge flap and the leading edge of the spanwise section of the wing forming a slot; and
   a vane coupled to the wing,
   wherein said vane comprises an inner aerodynamic surface that is separated from the wing and an outer aerodynamic surface that is separated from said leading edge flap, and
   wherein as some air flows between said outer aerodynamic surface of said vane and said leading edge flap and then through said slot, other air flowing in a forward direction from the flow attachment region to the wing leading edge, is deflected by said inner aerodynamic surface of said vane toward said slot.

6. The assembly as recited in claim 5, wherein said vane directs air flow forward from an attachment region of the wing lower surface toward the leading edge of the wing.

7. The assembly as recited in claim 5, wherein said leading edge flap and said vane are disposed on a spanwise section of the wing.

8. The assembly as recited in claim 5, wherein said vane is coupled to the wing and moveable between stowed and deployed positions.

9. The assembly as recited in claim 8, further comprising moveable linkage mounted to the wing, wherein said vane is attached to said linkage, which has a first position when said vane is in its stowed position and a second position when said vane is in its deployed position.

10. A method of directing air flow relative to a leading edge of a wing, the method comprising:
    (a) moving a leading edge flap from a stowed position to a deployed position, the flap being disposed forward of and separated from a leading edge of a spanwise section of the wing with a slot therebetween when in its deployed position and forming part of a lower surface of the spanwise section of the wing when in its stowed position; and
    (b) moving a vane from a stowed position to a deployed position, the vane being disposed below the slot and separated from the spanwise section of the wing when in its deployed position and being disposed inside the wing in its stowed position,
    wherein when the flap and the vane are in their respective deployed positions, and air is flowing between the deployed flap and vane and toward the slot, other air flowing in a forward direction underneath the wing is deflected toward the slot by the vane.

11. The method as recited in claim 10, wherein the vane directs air flow forward from an attachment region of the wing lower surface toward the leading edge of the wing when the flap and the vane are in their respective deployed positions.

12. The method as recited in claim 10, wherein the flap and the vane are disposed on a spanwise section of the wing.

13. The method as recited in claim 10, wherein the vane comprises an outer aerodynamic surface that faces the leading edge flap when the flap and the vane are in their respective deployed positions.

14. The method as recited in claim 10, wherein the vane comprises an inner aerodynamic surface that deflects air flow toward the leading edge of the wing when the vane is in its deployed position.

15. An aircraft wing comprising a leading edge and first and second leading edge airfoil-shaped bodies having respective stowed and deployed positions, the first and second leading edge airfoil-shaped bodies being disposed inside the wing envelope when in their respective stowed positions and being spaced apart from each other and spaced apart from the leading edge when in their respective deployed positions, the spacing between the leading edge and the first leading edge airfoil-shaped body forming a slot, wherein the first and second leading edge airfoil-shaped bodies are configured and positioned relative to the leading edge so that when air is flowing between the deployed first and second leading edge airfoil-shaped bodies and toward the slot, other air flowing in a forward direction underneath the wing is deflected toward the slot by the second leading edge airfoil-shaped body.

16. The aircraft wing as recited in claim 15, wherein each of the first and second leading edge airfoil-shaped bodies has a generally elongated shape, the first and second leading edge airfoil-shaped bodies being positioned substantially parallel to each other and to the leading edge.

* * * * *